(12) United States Patent
Seo

(10) Patent No.: US 7,537,512 B2
(45) Date of Patent: May 26, 2009

(54) MULTIPLE FLUID SUPPLYING APPARATUS FOR CARRIER OF SEMICONDUCTOR WAFER POLISHING SYSTEM

(75) Inventor: Sung Bum Seo, Gyeonggi-do (KR)

(73) Assignee: Doosan Mecatec Co., Ltd., Gyeongsangnam-so (KR)

( * ) Notice: Subject to any disclaimer, the term of this patent is extended or adjusted under 35 U.S.C. 154(b) by 0 days.

(21) Appl. No.: 11/913,831

(22) PCT Filed: Jun. 28, 2005

(86) PCT No.: PCT/KR2005/002021

§ 371 (c)(1),
(2), (4) Date: Nov. 7, 2007

(87) PCT Pub. No.: WO2007/001100

PCT Pub. Date: Jan. 4, 2007

(65) Prior Publication Data

US 2008/0194189 A1     Aug. 14, 2008

(51) Int. Cl.
*B24B 1/00* (2006.01)
(52) U.S. Cl. ............... 451/41; 451/63; 451/288; 451/398; 137/580
(58) Field of Classification Search .......... 451/41, 451/63, 285, 287, 288, 290, 398, 446; 137/580
See application file for complete search history.

(56) References Cited

U.S. PATENT DOCUMENTS 6,234,815 B1   5/2001   Omiya et al.
2002/0086617 A1 * 7/2002 Garcia et al. ............ 451/41
2002/0137448 A1   9/2002   Suh et al.

FOREIGN PATENT DOCUMENTS

| JP | 2001-141449 A1 | 5/2001 |
| KR | 2004-0109981 A1 | 12/2004 |
| KR | 10-2005-0069735 A | 7/2005 |
| WO | 2004090964 A1 | 10/2004 |

* cited by examiner

*Primary Examiner*—Eileen P. Morgan
(74) *Attorney, Agent, or Firm*—Steven J. Hulquist; Intellectual Property/Technology Law

(57) ABSTRACT

The present invention related to a multiple fluid supplying apparatus for carrier of semiconductor wafer polishing system which comprises a rotary union at a driving side and a rotary union at a following side. The rotary union at a driving side comprises a central rotation axle; a fluid supplying tube body being disposed coaxially with the central rotation axle, being fixedly supported, and being formed with a plurality of fluid paths at an inside thereof; a sealing housing being disposed coaxially on an outer circumference of the fluid supplying tube body so as to be rotatably supported; and a sealing unit for maintaining air-tightness between the fluid supplying tube body and the sealing housing. The rotary union at a following side comprises a central rotation axle; a sealing housing being disposed coaxially along a circumference of the central rotation axle, one end thereof being fixed to an inside of the spindle so as to support the central rotation axle to be rotated stably; and a sealing unit for maintaining air-tightness between the central rotation axle and the sealing housing. According to the present invention, 1) lowering sealing performance by a rolling phenomenon occurring between both ends of a central rotation axle when it rotates is prevented, 2) operational fluid is supplied smoothly to each carrier, and 3) high sealing performance is maintained while simplifying a contact portion between a rotational body and a non-rotational body into a single-layered sealing structure.

2 Claims, 9 Drawing Sheets

MULTIPLE FLUID SUPPLYING APPARATUS FOR CARRIER OF SEMICONDUCTOR WAFER POLISHING SYSTEM

CROSS REFERENCE TO RELATED APPLICATION

This application is filed under the provisions under the provisions of 35 USC 371 based on International Application PCT/KR2005/002021 filed Jun. 28, 2005. The disclosure of such International application is hereby incorporated herein by reference in its entirety, for all purposes.

TECHNICAL FIELD

The present invention relates to a multiple fluid supplying apparatus for carrier of semiconductor wafer polishing system. More specifically, the present invention relates to a multiple fluid supplying apparatus for a carrier of semiconductor wafer polishing system where a chemical mechanical polishing (CMP) tool on which at least one carrier is mounted has a structure of a dual system that a power transfer system and an operational fluid supplying system are separated independently and capable of supporting a rotational member securely so that deterioration of sealing performance caused by a fine rolling between both ends of a power transfer axle when being rotated can be prohibited and operational fluid can be smoothly supplied to respective carriers as well, thereby a contact portion between a rotating body and a non-rotating body is simplified to be a single-layered sealing structure while a high sealing property thereof is maintained.

BACKGROUND ART

Generally, a chemical mechanical polishing (CMP) tool is a tool to be mainly used in semiconductor manufacturing processes and is known to be a polishing tool for a highly fine flattening process to remove the steps between multiple wiring layers of a wafer surface through a mechanical polishing and a chemical reaction.

To describe a general structure of a CMP tool briefly, a CMP tool comprises a platen (a polishing table) on which a polishing pad (resilient polishing paper) is attached to; a polishing carrier (a polishing head) for pressing downward and being rotated while gripping a wafer to make a mutual contact between the polishing pad and a surface of the wafer; a slurry supply nozzle for providing slurry onto the polishing pad; and a conditioner carrier for gripping and rotating a dressing conditioner which prohibits a shape change or contamination of a surface of the polishing pad so that polishing performance of the polishing pad is continuously maintained. The CMP tool is designed to physically flatten convex and concave portions of a wafer surface by moving the platen and the polishing carrier relatively while supplying slurry onto the wafer surface and reacting slurry with the wafer surface chemically under a condition that a wafer is contacted with a surface of the polishing pad.

Currently, a study on the CMP tool is actively going on to improve performance of each member thereof. In this end, the applicant of the present application suggested "a multiple fluid supplying apparatus for polishing and conditioner carriers of a polishing system of semiconductor wafer" described in Korean patent application No. 2003-39627 (hereinafter referred to '627 application), where a rotary union is applied to flow slurry while maintaining a high airtight sealing between a non-rotating body and a rotating body during a relative movement between respective members thereof.

The structure of a multiple fluid supplying apparatus suggested in '627 application comprises a rotary union at a driving side wherein a hollow rotation axle being formed with a plurality of through-holes is installed and rotated on a non-rotatable, central fixed axle formed with a fluid path, a non-rotatable sealing housing for support is installed which supports the hollow rotation axle on an outer circumference thereof and exhausts operational fluid outside, and a dual structured stack-type sealing rod is provided which is closely intervened in a stacked manner respectively at an inner and an outer sides of the hollow rotation axle for maintaining air-tightness between the central fixed axle, the hollow rotation axle and the sealing housing, a spindle which is combined with the hollow rotation axle and is capable of rotating about the outer circumference of the hollow rotation axle without interference therewith; a spindle housing for supporting the spindle; a driving device for rotating the hollow rotation axle and the spindle, respectively; a rotary union at a following side wherein a sealing housing being formed with a plurality of through-holes is installed on a central rotation axle being formed with a plurality of fluid paths combined integrally with carrier axles of a plurality of carrier connection members which are provided symmetrically about the central fixed axle in the spindle in order to supply operational fluid to the carrier connection members so that the rotary union at the following side is supported in a non-rotational condition by a bracket connected to the sealing housing of the rotary union at the driving side, and a stack-type sealing rod with a single-layered structure is provided which is closely intervened in a stacked manner between the central rotation axle and the sealing housing for maintaining air-tightness therebetween; a plurality of conduits for connecting the through-holes together formed in the respective sealing housings of the rotary union at the driving side and the rotary union at the following side; and a power transfer member for transferring rotational force from the rotary union at the driving side to the respective carrier connection members.

However, the rotary union structure suggested in the '627 application has some problems. That is, in the rotary union structure at the driving side, one end of the central fixed axle formed with a fluid path is supported on top of the spindle housing by way of a bracket, while the other end thereof is supported by an inner circumference surface of the hollow rotation axle, and power is transferred by engaging a driving belt with the hollow rotation axle of the outer circumference thereof so that the support condition of the central fixed axle for flowing fluid is unstable. This causes a rolling (or run-out) between both ends of the central fixed axle or the hollow rotation axle when rotational force is transferred to the hollow rotation axle so that a phenomenon that a sealing portion between a rotating body and a non-rotating body is partially separated from or excessively contacted with each other in an irregular manner repeatedly occurs which leads to a risk of operational fluid leakage due to uneven abrasion of a sealing member itself. This may be caused by a severe rolling phenomenon due to a weak structure in which the respective sealing housings of the rotary union at the driving side and the rotary union at the following side are connected simply by a bracket.

Yet another problem in the rotary union structure at the driving side is that the inner and outer circumferential surfaces of the hollow rotation axle which correspond to a contact portion of a rotational body and a non-rotational body to be sealed are dually sealed so that the structure thereof becomes complicated and there is a high possibility of operational fluid leakage due to a widened area for maintaining air-tightness compared with a single-layered sealing structure as well.

Yet another problem in a sealing structure of a contact portion between a rotational body and a non-rotational body of the rotary union structure at the driving side or at the following side is that, in the multiple fluid supplying apparatus suggested in '627 application, like a prior art, the sealing member is transformed by heating due to physical friction of the sealing member and is continuously abraded as well and therefore air-tightness thereof is gradually worsened.

Yet another problem is that the carrier axles of the respective carrier connection members are received in an inner space of the spindle and thus it is inconvenient and cumbersome because the whole apparatus must be disassembled when maintenance thereof is required.

DISCLOSURE OF INVENTION

Technical Problem

The object of the present invention is to solve the prior art problems and to provide a multiple fluid supplying apparatus for carrier of semiconductor wafer polishing system for preventing deterioration of sealing performance due to a fine rolling phenomenon occurring between both ends of a power transfer axle when it rotates and for supplying operational fluid smoothly to respective carriers, by providing a structure with a dual system being capable of supporting a rotational portion securely, by way of separating a power transfer system from operational fluid supplying system, and for maintaining high sealing performance while establishing a simplified single-layered sealing structure in a contact portion between a rotational body and a non-rotational body.

Yet another object of the present invention is to provide a multiple fluid supplying apparatus for carrier of semiconductor wafer polishing system for rotating respective carriers stably and for improving sealing performance as well by providing the structure where rotary unions at a driving side and at a following side are fixed securely onto a spindle.

Yet another object of the present invention is to provide a multiple fluid supplying apparatus for carrier of semiconductor wafer polishing system capable of maintaining sealing performance of a sealing member for a long time through preventing transformation of a sealing member due to a frictional heating by providing a means for supporting the sealing member with resilient pressure even though the sealing member is abraded to some extent and providing a cooling structure capable of exhausting heat smoothly outside which is generated at an inside of the spindle, without mounting a separate cooling circulation device, as well.

Yet another object of the present invention is to provide a multiple fluid supplying apparatus for carrier of semiconductor wafer polishing system where the carrier axles of the respective carrier connection members and the driving devices thereof are structured independently by receiving them in separate spares which are located at an outside of the spindle so that maintenance thereof can be simply performed by a partial disassembly and assembly without disassembling the whole apparatus.

Technical Solution

To achieve the above objects, a multiple fluid supplying apparatus for carrier of semiconductor wafer polishing system in accordance with the present invention comprises a driving source for generating certain rotational force; a rotary union at a driving side comprising a central rotation axle being rotatably supported for transferring the certain rotational force transferred from the driving source toward outside, a fluid supplying tube body being disposed coaxially with the central rotation axle, being fixedly supported, and being formed with a plurality of fluid paths at an inside thereof, a manifold plate for fixing the fluid supplying tube body and being provided with a plurality of fluid paths communicating with the fluid paths formed in the fluid supplying tube body, a sealing housing being disposed coaxially on an outer circumference of the fluid supplying tube body, being rotatably supported, being formed with through-holes communicating outside at positions corresponding to the respective fluid paths of the fluid supplying tube body, and being formed with a plurality of flow holes capable of flowing operational fluid along an inner circumferential surface of the respective through-holes, and a sealing unit being stacked mutually and operatively intervened between the fluid supplying tube body and the sealing housing for maintaining air-tightness therebetween; a spindle being installed rotatably on an outer side of the fluid supplying tube body, having a space for receiving a certain device therein, and being connected to the driving source independently of the central rotation axle for rotational force to be transferred from the deriving source; a non-rotatable spindle housing for supporting the spindle on an outer circumference thereof; at least one carrier connection axle being rotated at a certain speed upon receipt of rotational force from the central rotation axle of the rotary union at the driving side and being formed with a plurality of fluid paths therein; a carrier being fixedly connected at a bottom of the carrier connection axle; at least one rotary union at a following side comprising a central rotation axle being combined integrally with a top of the carrier connection axle and being rotated by rotational force transferred from the carrier connection axle, and being formed with a plurality of fluid paths for flowing fluid to a fluid communicating path formed at an inside of the carrier connection axle, a non-rotational sealing housing being disposed coaxially along a circumference of the central rotation axle, one end thereof being fixed to an inside of the spindle so as to support the central rotation axle to be rotated stably, being formed with through-holes communicating outside at positions corresponding to the respective fluid paths of the central rotation axle, and being formed with a plurality of flow holes capable of flowing operational fluid along inner circumferential surfaces of the respective through-holes, and a sealing unit being stacked mutually and operatively intervened between the central rotation axle and the sealing housing for maintaining air-tightness therebetween; and a plurality of conduits for connecting the through-holes together formed in the respective sealing housings of the rotary union at the driving side and the rotary union at the following side.

Further, it is preferable that the sealing unit of the rotary union at the driving side comprises a pair of inner stacked support rings being closely stacked respectively around an outer circumference of the fluid supplying tube body and being formed with a through-hole for flowing fluid; a deionized water circulation ring being intervened between the inner stacked support rings and communicating the through-holes between the fluid supplying tube body and the respective adjacent sealing housings; a pair of packing rings being contacted with upper and lower circumferential surfaces of the deionized water circulation ring for maintaining air-tightness; a pair of gasket rings disposed at upper and lower outsides of the respective packing rings; a pair of bellows rings disposed at upper and lower outsides of the respective gasket rings as a resilient pressing means for providing pressing force to press the respective packing rings toward upper and lower circumferential surfaces of the deionized water circulation ring; and a pair of outer stacked support rings being closely stacked on inner circumferential surfaces of the respective sealing housings for fixing and supporting the gasket rings and the bellows rings, wherein the packing rings, the deionized water circulation ring, the outer stacked support rings, the packing rings, the gasket rings, and the bellows rings respectively are stacked in a multiple number in a space between the fluid supplying tube body and the respective sealing housings, while being mutually combined with each other.

ADVANTAGEOUS EFFECT

A multiple fluid supplying apparatus for carrier of semiconductor wafer polishing system according to the present invention accomplishes an effect that sealing performance is improved by minimizing a rolling phenomenon occurring between both ends of a central rotation axle when it rotates and operational fluid is supplied smoothly to each carrier, by providing a structure with a dual system by means of separating a power transfer system from an operational fluid supplying system and being capable of supporting a rotational portion securely by a spindle and a spindle housing in a CMP tool on which at least one carrier is mounted, and high sealing performance is maintained by establishing a simplified single-layered sealing structure of a contact portion between a rotational body and a non-rotational body.

BEST MODE FOR CARRYING OUT THE INVENTION

Hereinafter, a multiple fluid supplying apparatus for carrier of semiconductor wafer polishing system in accordance with embodiments of the present invention is described in more detail by reference to the accompanying drawings.

Figure 1:
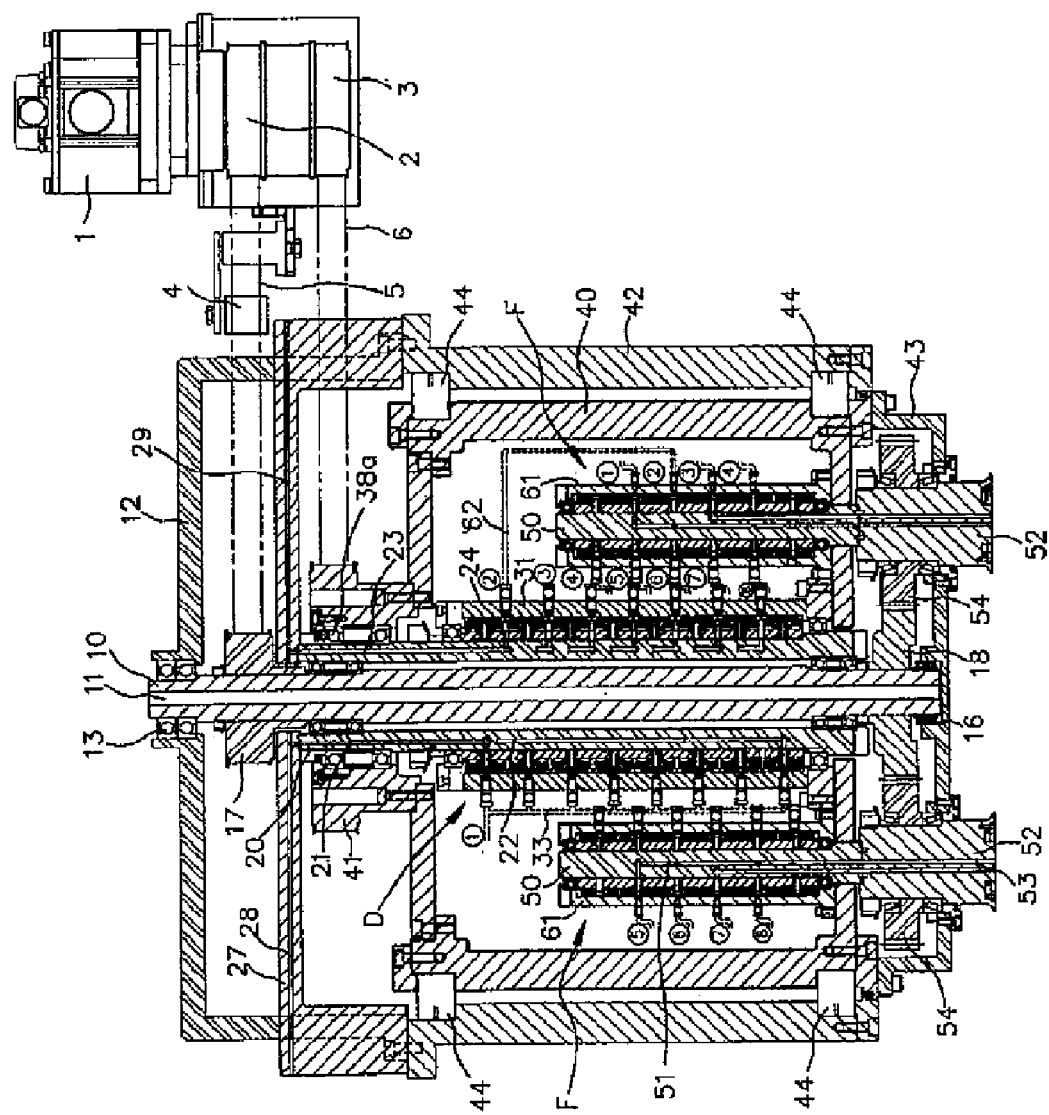
FIG. 1 is a schematic vertical cross-sectional view illustrating a whole assembly structure of a CMP tool to which a multiple fluid supplying apparatus is applied in accordance with the present invention.
Figure 2:
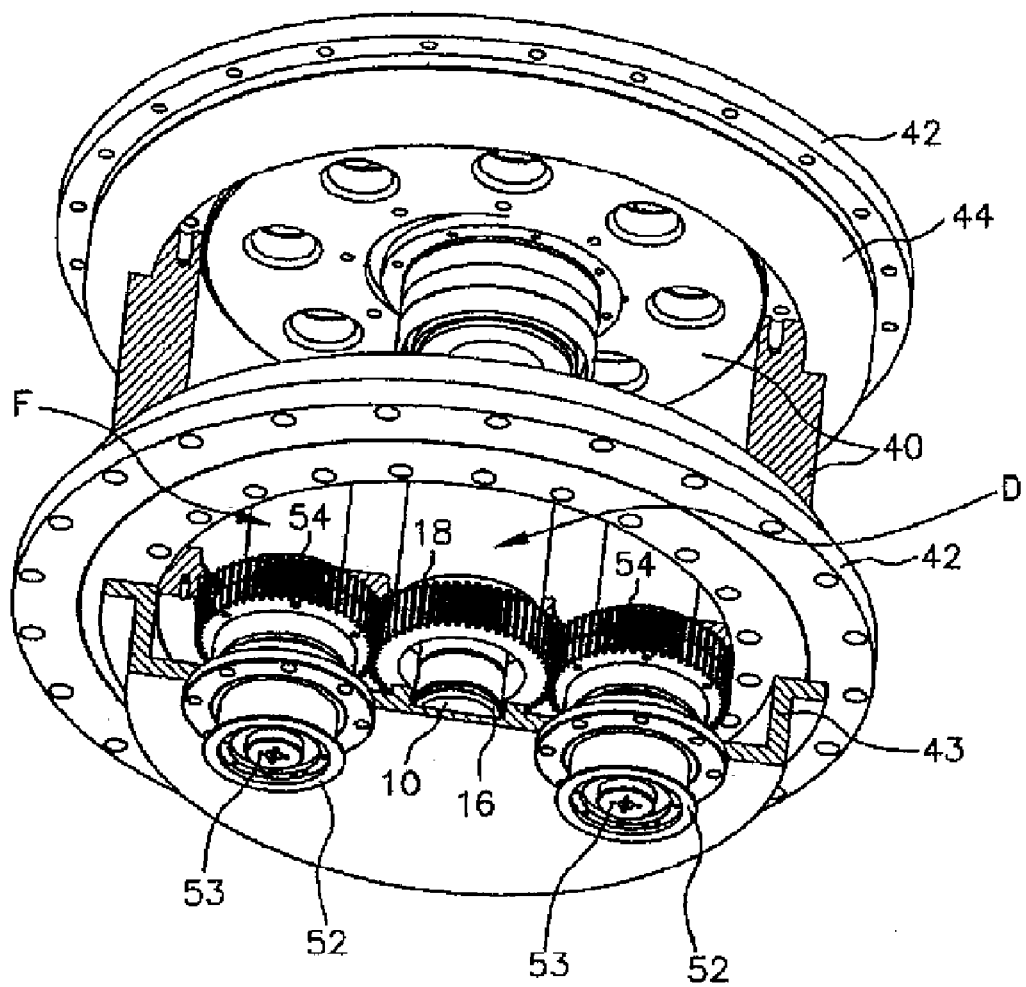
FIG. 2 is a schematic bottom perspective view illustrating a partially cut-out inner structure of a rotary union at a driving side and a rotary union at a following side in order to explain a power transfer principle between the rotary union at the driving side and the rotary union at the following side in accordance with the present invention.
Figure 3:
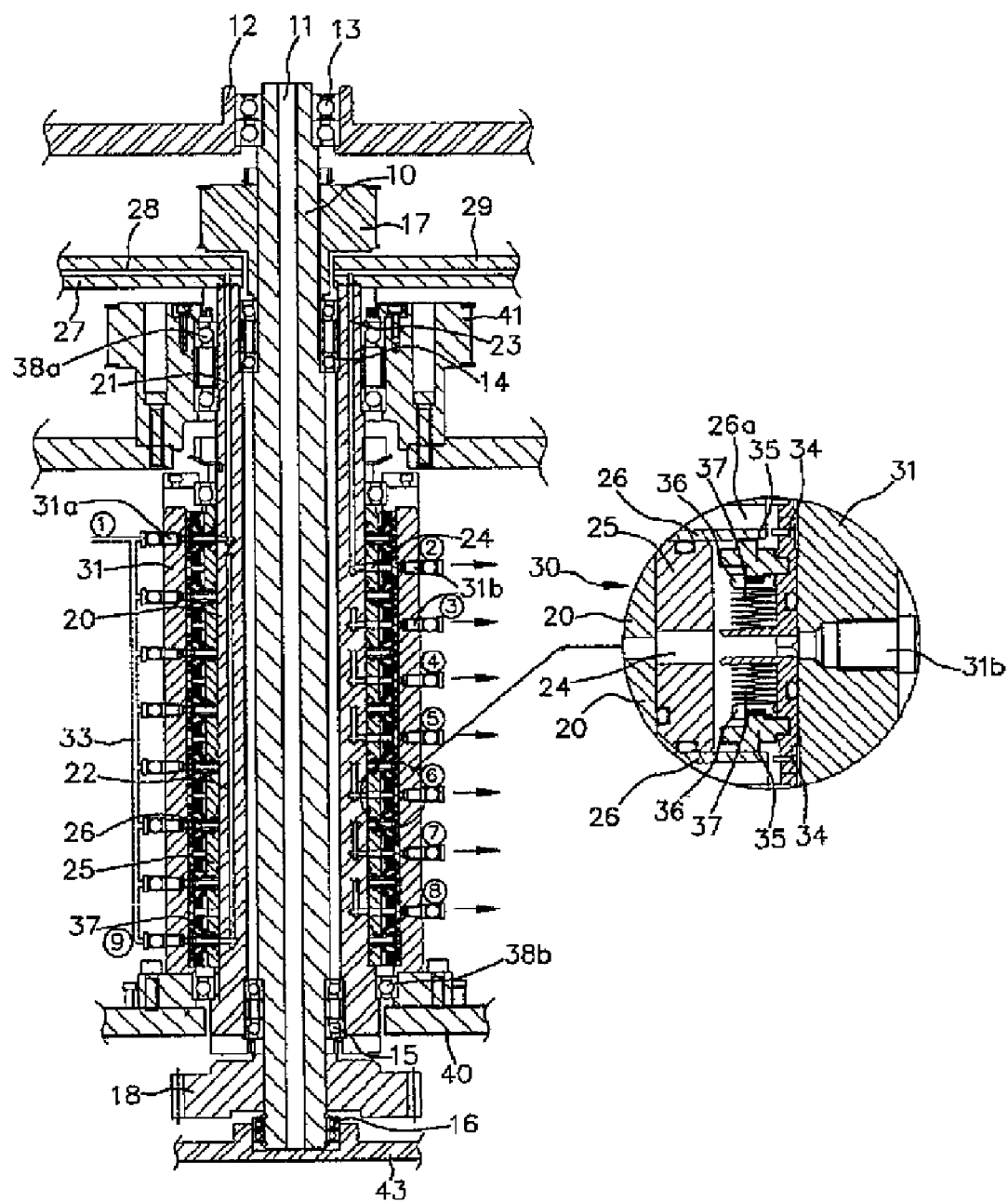
FIG. 3 is a cross-sectional view and a partially enlarged view illustrating a structure of a rotary union at a driving side and a stack-type structure of a sealing unit intervened in an inner part thereof applied to the present invention.
Figure 4:
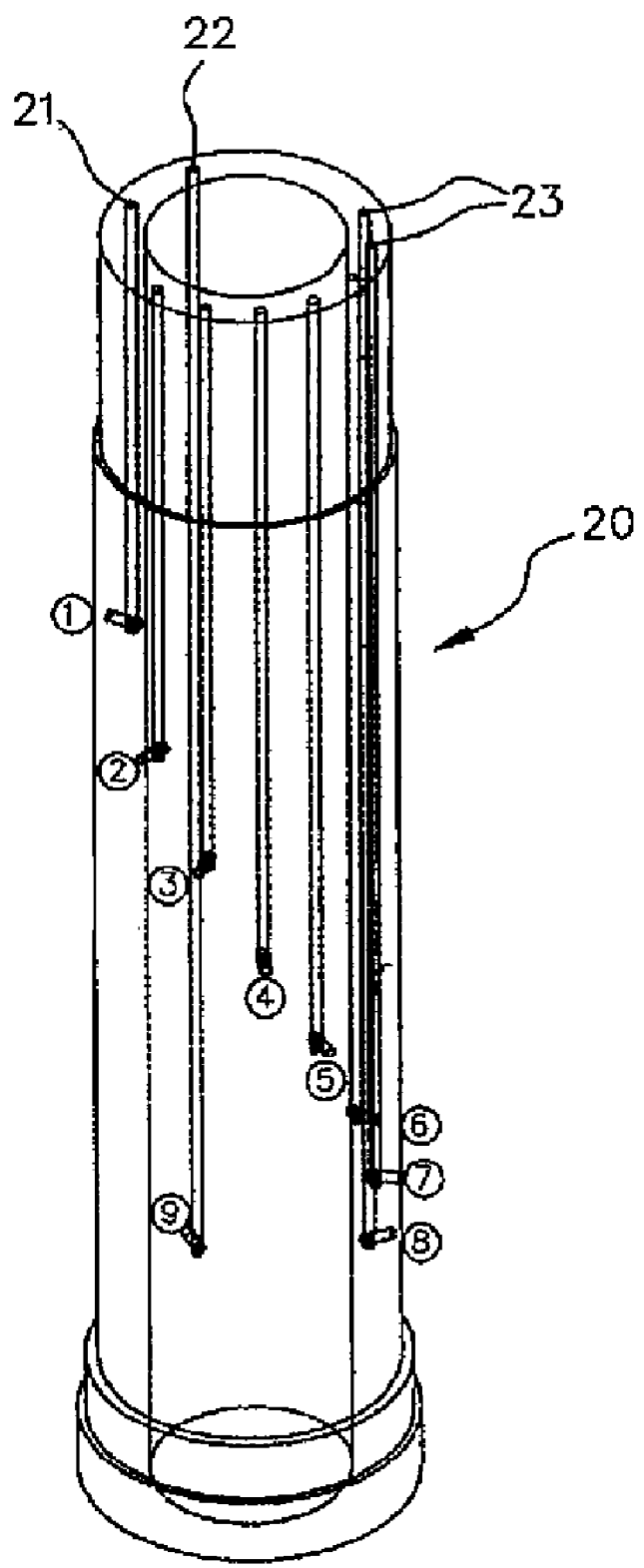
FIG. 4 is a perspective view illustrating a fluid path structure of a fluid supplying tube body applied to a rotary union at a driving side illustrated in FIG. 3.
Figure 5:
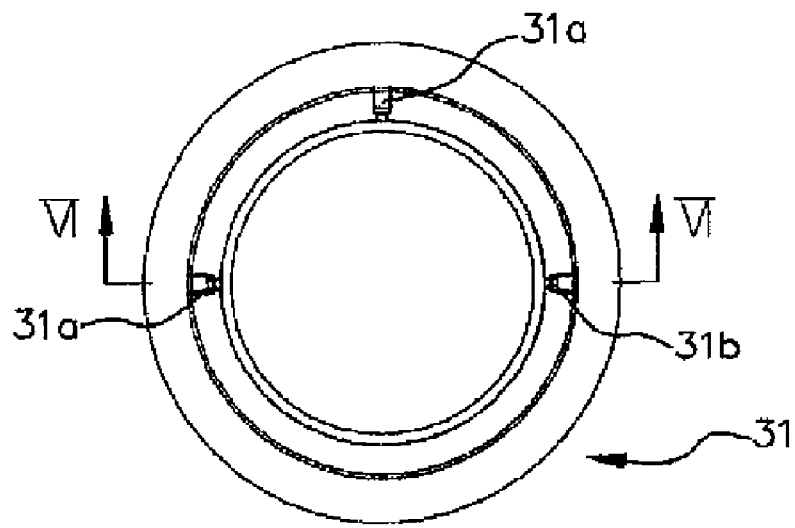
FIG. 5 is a top view illustrating a sealing housing applied to a rotary union at a driving side illustrated in FIG. 3.
Figure 6:
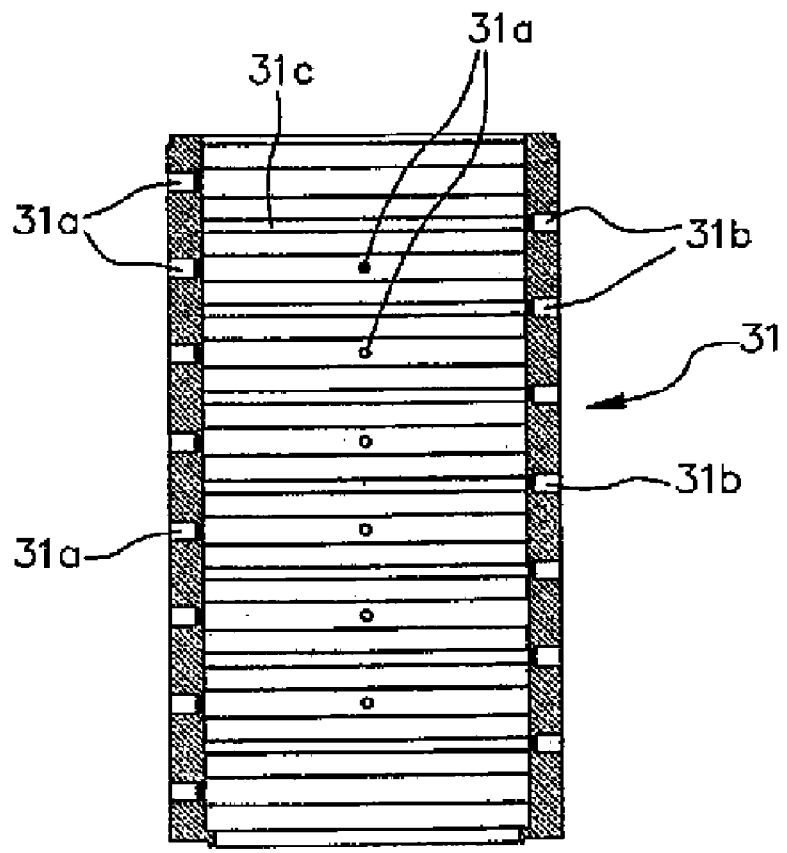
FIG. 6 is a cross-sectional view seen along a VI-VI line illustrated in FIG. 5.
Figure 7:
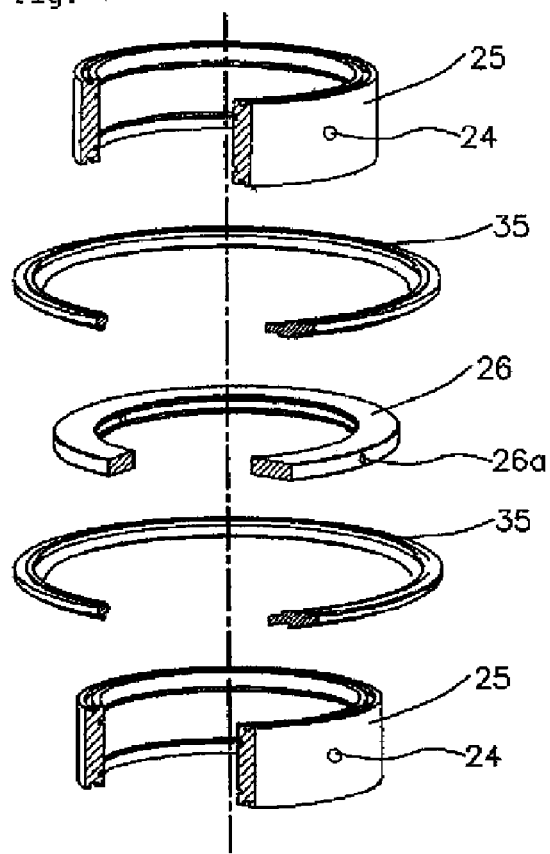
FIG. 7 is a explosive schematic view illustrating a main part of a partially cut-out sealing unit intervened between a fluid supplying tube body of a rotary union at a driving side and a sealing housing or between a central rotation axle of a rotary union at a following side and a sealing housing which is applied to the present invention.
Figure 8:
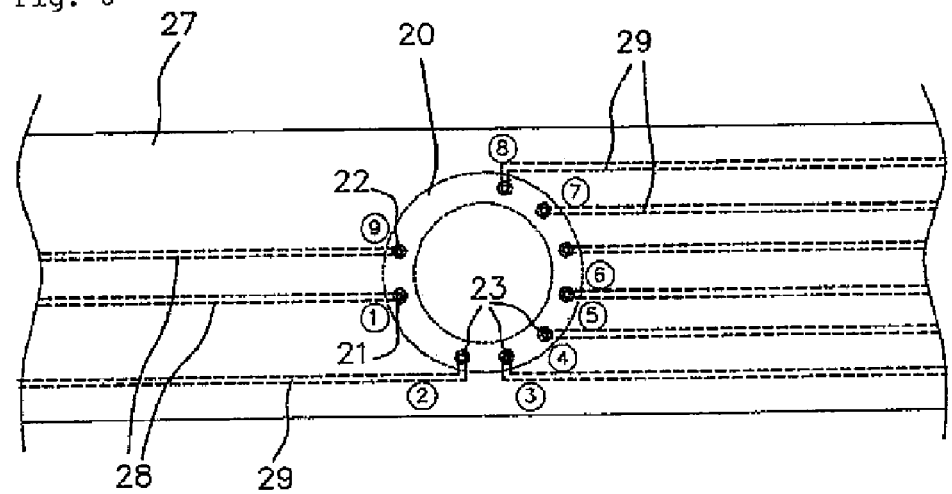
FIG. 8 is a top view illustrating a structure of a manifold plate which fixes a fluid supplying tube body applied to the present invention.
Figure 9:
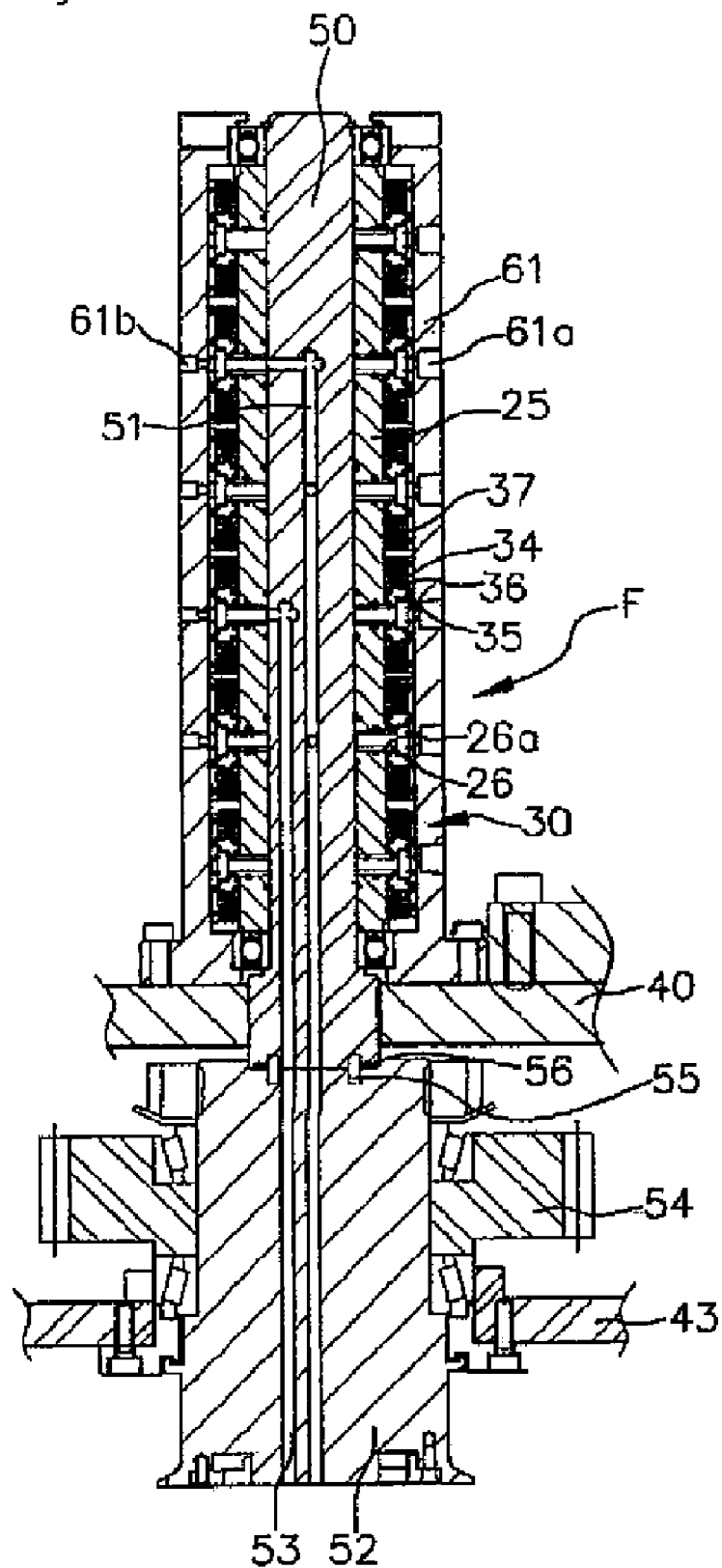
FIG. 9 is a vertical cross-sectional view illustrating a combined structure of a rotary union at a following side and a carrier connection axle applied to the present invention.
Figure 10:
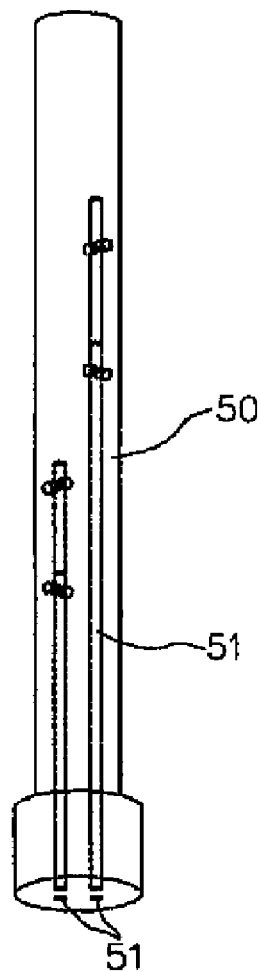
FIG. 10 is a bottom perspective view illustrating a fluid path structure of a central rotation axle applied to a rotary union at a following side illustrated in FIG. 9.
Figure 11:
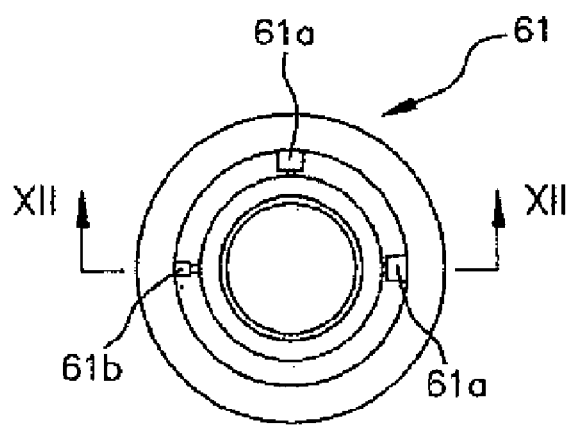
FIG. 11 is a top view of a sealing housing applied to a rotary union at a following side illustrated in FIG. 9.
Figure 12:
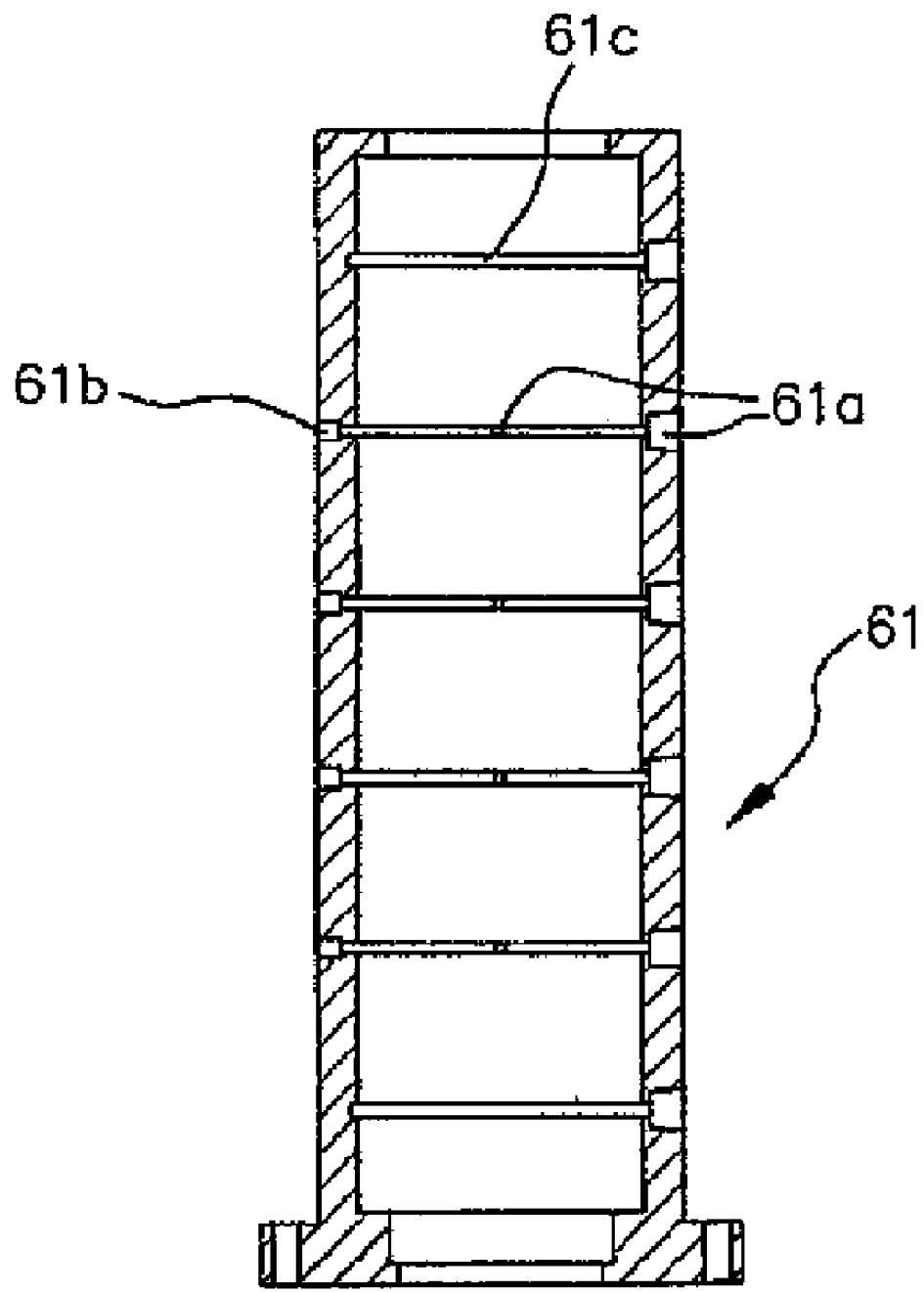
FIG. 12 is a cross-sectional view seen along XII-XII line illustrated in FIG. 9.

FIGS. 1 to 12 illustrate a whole structure and detailed structure of respective parts of a multiple fluid supplying apparatus for carrier of semiconductor wafer polishing system in accordance with the present invention. More specifically, FIG. 1 is a schematic vertical cross-sectional view illustrating a whole assembly structure of a CMP tool to which a multiple fluid supplying apparatus is applied in accordance with the present invention. FIG. 2 is a schematic bottom perspective view illustrating a partially cut-out inner structure of a rotary union at a driving side D and a rotary union at a following side F in order to explain a power transfer principle between the rotary union at the driving side and the rotary union at the following side in accordance with the present invention. FIG. 3 is a cross-sectional view and a partially enlarged view illustrating a structure of a rotary union at a driving side D and a stack-type structure of a sealing unit 30 intervened in an inner part thereof applied to the present invention. FIG. 4 is a perspective view illustrating a fluid path 23 structure of a fluid supplying tube body 20 applied to a rotary union at a driving side D illustrated in FIG. 3. FIG. 5 is a top view illustrating a sealing housing 31 applied to a rotary union at a driving side D illustrated in FIG. 3. FIG. 6 is a cross-sectional view seen along a VI-VI line is illustrated in FIG. 5. FIG. 7 is a explosive schematic view illustrating a main part of a partially cut-out sealing unit 30 intervened between a fluid supplying tube body 20 of a rotary union at a driving side D and a sealing housing 31 or between a central rotation axle of a rotary union at a following side F and a sealing housing 61 which is applied to the present invention. FIG. B is a top view illustrating a structure of a manifold plate 27 which fixes a fluid supplying tube body 20 applied to the present invention. FIG. 9 is a vertical cross-sectional view illustrating a combined structure of a rotary union at a following side F and a carrier connection axle applied to the present invention. FIG. 10 is a bottom perspective view illustrating a fluid path 51 structure of a central rotation axle 50 applied to a rotary union at a following side F illustrated in FIG. 9. FIG. 11 is a top view of a sealing housing 61 applied to a rotary union at a following side F illustrated in FIG. 9. FIG. 12 is a cross-sectional view seen along XII-XII line illustrated in FIG. 9.

As illustrated in FIG. 1, a multiple fluid supplying apparatus for carrier of semiconductor wafer polishing system in accordance with the present invention comprises a driving source (not shown), a rotary union at a driving side D, a spindle 40, a spindle housing 42, carrier connection axles 52, a polishing carrier and a conditioner carrier (not shown), rotary unions at a following side F, and conduits 62. Herein, an axle to which the polishing carrier and the conditioner carrier are connected and a driving device thereof are similar to each other in their structures and therefore same reference numerals will be assigned to them in the drawings.

In more detail, a multiple fluid supplying apparatus for carrier of semiconductor wafer polishing system in accordance with the present invention comprises a driving source being comprised of a decelerated motor 1, a carrier driving pulley 2 and a spindle driving pulley 3; a rotary union at a driving side D; a spindle 40 combined with a fluid supplying tube body 20 of the rotary union at the driving side D in a manner that the spindle 40 may rotate about the fluid supplying tube body 20 without interference therewith; a spindle housing 42 for supporting the spindle 40 at an outer circumference thereof, carrier connection axles 52,52 which rotate at a certain speed when rotational force is transferred from a central rotation axle 10 of the rotary union at the driving side D; carriers (not shown) fixedly connected to bottom ends of the carrier connection axles 52,52; rotary unions at following sides F installed on an outer circumference of the rotary union at a driving side D; and a plurality of conduits 62 for interconnecting through-holes 31a,31b,61a,61b formed on the respective sealing housings 31,61 of the rotary union at the driving side D and the rotary unions at following sides F.

Herein, the respective central rotation axles 10,50 of the rotary union at the driving side D and the rotary unions at the following sides F, the respective carrier connection axles 52, the sealing housing 31 of the rotary union at the driving side D, and the spindle 40 are a rotational body, while the fluid supplying tube body 20 of the rotary union at the driving side D, the sealing housing 61 of the rotary unions at the following sides F, and the spindle housing 42 are a non-rotational body. The rotational body and the non-rotational body are operatively supported without interference therewith by respective bearings 13,14,15,16,38a,38b,44 therebetween.

First, as illustrated in FIG. 3, the rotary union at the driving side D comprises a central rotation axle 10 for transferring power toward respective carriers with being rotatably driven together with a carrier following pulley 17 when rotational force is transferred to the carrier following pulley 17 from a driving source; a non-rotatable fluid supplying tube body 20 being disposed coaxially with the central rotation axle 10; a manifold plate 27 for fixing the fluid supplying tube body 20 to be non-rotatable and being provided with a fluid path 29 for supplying operational fluid; a sealing housing 31 being disposed coaxially with the fluid supplying tube body 20 for exhausting the operational fluid outside and being rotatably driven when the power is transferred to a spindle following pulley 41 due to a bottom end of the sealing housing 31 being fixed to a spindle 40; and a sealing unit 30 intervened between the fluid supplying tube body 20 and the sealing housing 31 for maintaining air-tightness therebetween.

Hereinbelow, the structure of respective members will be described in more detail. First, the central rotation axle 1a is formed with a fluid path 11 through an inside thereof. Both circumferential ends of the central rotation axle 10 are rotatably supported by means of bearings 13,16 in a manner that one end thereof is supported by a bracket 12 connected to a spindle housing 42 and the other end is supported by the spindle 40. The central rotation axle 10 receives power from a driving source and transfers rotational force to each carrier through a carrier driving gear 18. The fluid path 11 may supply operational fluid directly, if required, and the carrier driving gear 18 is engaged with a carrier following gear 54 which is combined with a carrier connection axle 52 of each carrier.

In addition, the fluid supplying tube body 20, as illustrated in FIGS. 3 and 4, is supported coaxially with the circumference of the central rotation axle 10 between bearings 14,15. A deionized water path 21, a deionized water return path 22, and a plurality of fluid paths 23 is formed at an inside of the fluid supplying tube body 20.

For reference, in FIGS. 1 and 3, a deionized water path 21, a deionized water return path 22, and a plurality of fluid paths 23 are conceptually shown as a vertical cross-sectional view along a central-cut surface due to a limitation in representing their exact positions and thus it is desirable to grasp the structure thereof mainly by referring to FIG. 4. In the drawings, the deionized water path 21 is additionally indicated as 'a circled number 1' for describing the flow of deionized water or operational fluid, etc. later, the deionized water return path 22 is additionally indicated as 'a circled number 9', and the fluid paths 23 are indicated as 'circled numbers 2 to 8' in their order.

The deionized water path 21 is a path for entry of deionized water (cooling water) supplied through a deionized water path 28 of the manifold plate 27. The deionized water return path 22 is a path that deionized water is circulated along a certain fluid path and then is reentered into the fluid supplying tube body 29 and then is returned to another deionized water path 28 of the manifold plate 27. The fluid paths 23 are paths for supplying operational fluid to respective flow holes 31c connected to respective through-holes 31b of the sealing housing 31. That is, the fluid paths 23 are disposed with a certain interval along a circumference of a tube body and are formed respectively through a longitudinal direction of the tube body at each disposed position where the positions of the through-holes 31b at the ends of the respective fluid paths 23 are formed in a step-wise manner.

Further, the manifold plate 27, as illustrated in FIGS. 1 and 8, receives the central rotation axle 10 in an insertion manner through a hole formed at the center thereof. The manifold plate 27 is closely attached to one end of the fluid supplying tube body 20 and therefore fixes the fluid supplying tube body 20. The manifold plate 27 is formed with a pair of deionized water paths 28 and a plurality of fluid paths 29 which communicates the deionized water path 21, the deionized water return path 22, and the fluid paths 23 of the fluid supplying tube body 20 at an inside thereof.

Yet further, the sealing housing 31, as illustrated in FIGS. 3, 5 and 6, is disposed coaxially along the circumference of the fluid supplying tube body 20 between bearings 38a,38b and is supported rotatably on the fluid supplying tube body 20. The sealing housing 31 is formed with respective through-holes 31a,31b communicating outside at respective positions corresponding to the deionized water path 21, the deionized water return path 22, and the fluid paths 23 of the fluid supplying tube body 20. The sealing housing 31 is also formed with a plurality of flow holes 31c which may flow operational fluid along the inner surfaces of the through-holes 31a,31b. A connection tube 33 is connected to the through-holes 31a to connect flow paths therebetween.

To describe briefly a flow path connection structure for supplying fluid from the manifold plate 27 to the fluid supplying tube body 20 to the sealing housing 31 as described above, the manifold plate 27 is formed with a pair of deionized water path 28 and a plurality of fluid paths 29, respectively, for supplying deionized water from outside and for returning it. The fluid supplying tube body 20 is formed with a deionized water path 21 communicating respective deionized water paths 28, a deionized water return path 22, and a plurality of fluid paths 23, respectively. A sealing housing 31 is formed with a deionized water path 21 communicating respective deionized water paths 28, a deionized water return path 22, and a plurality of through-holes 31a,31b communicating a plurality of fluid paths 23. A multi-branch type connection tube 33 communicating between the respective through-holes 31a,31b for deionized water to be circulated through the respective through-holes 31a,31b is combined with an outside of the sealing housing 31.

In addition, the sealing unit 30, as illustrated in FIGS. 3 and 7, has an inserted structure where the sealing unit 30 is stacked mutually and operatively with the fluid supplying tube body 20 and the sealing housing 31 for maintaining air-tightness therebetween.

The sealing unit 30 comprises a pair of inner stacked support rings 25 being closely stacked around an outer circumference of the fluid supplying tube body 20; a deionized water circulation ring 26 being intervened between the inner stacked support rings 25 and being formed with a through-hole 26a selectively communicating between respective through-holes 24,31b of the fluid supplying tube body 20 and the sealing housing 31; a pair of packing rings 35 being contacted with upper and lower circumferential surfaces of the deionized water circulation ring 26 for maintaining air-tightness; a pair of gasket rings 36 disposed at upper and lower outsides of the respective packing rings 35; a pair of bellows rings 37 disposed at upper and lower outsides of the respective gasket rings 36 as a resilient pressing means for providing pressing force to press the respective packing rings 25 toward upper and lower circumferential surfaces of the deionized water circulation ring 26; and a pair of outer stacked support rings 34 being closely stacked on an inner circumferential surface of the sealing housing 31 for fixing and supporting the gasket rings 36 and the bellows rings 37. The respective members 25,26,34,35,36,37 are stacked in a multiple number in a space between the fluid supplying tube body 20 and the sealing housing 31, while being mutually combined with each other. The sealing unit 30 is identically applied to a sealing unit as a means for maintaining air-tightness between a central rotation axle 50 and a sealing housing 61 of the rotary unions F at the following sides, which will be described later.

Further, the spindle 40 is formed with a spindle following pulley 41 on a top thereof and is engaged with a spindle driving pulley 3 of the driving source by a driving belt 6. Herein, the driving source is comprised of a deceleration motor 1 fixed to one side of the spindle housing 42. As the deceleration motor 1, a servo motor capable of controlling a forward rotation and a reverse rotation, and the number of turns, etc. The carrier driving pulley 2 and the spindle driving pulley 3 are respectively connected to the axis of deceleration motor 1. A belt tensioner 4 for controlling tension is installed at one side of the driving belts 5,6 of the carrier driving pulley 2 and the spindle driving pulley 3.

In the meantime, the rotary unions F at the following sides, as illustrated in FIGS. 1 and 9 to 12, have a structure for supplying operational fluid to respective carriers. A rotary union F at a following side comprises a central rotation axle 50 being combined integrally with a carrier connection axle 52 of the respective carriers thereon, being disposed in an inner space of the spindle 40 with a symmetrical shape about the central rotation axle 10 of the rotary union D at the driving side so as to make a rotation by rotational force transferred from the respective carrier connection axle 52 and to make a revolution as well by rotational force of the spindle 40 along the central rotation axle 10 of the rotary union D at the driving side, and being formed with a plurality of fluid paths 52 communicating the inner fluid paths 53 of the respective carrier connection axle 52; a non-rotational sealing housing 61 being disposed coaxially along a circumference of the central rotation axle 50 between bearings (not shown), one end thereof being fixed to an inside of the spindle 40 so as to support the central rotation axle 50 to be rotated stably, being formed with through-holes 61a,61b communicating outside at positions corresponding to the respective fluid paths 51 of the central rotation axle 50, and being formed with a plurality of flow holes 61c capable of flowing operational fluid along inner circumferential surfaces of the respective through-holes 61a,61b; and a seating unit 30 being stacked mutually and operatively with the central rotation axle 50 and the seating housing 61 for maintaining air-tightness therebetween.

Herein, the central rotation axle 50 and the carrier connection axle 52 are assembled as a structure to be rotated integrally by a connection pin 55 and combined together by means of an O-ring 56 for sealing therebetween.

In addition, a plurality of conduits 62 is combined with the through-holes 31a,31b,61a,61b formed on the respective sealing housings 31,61 of the rotary union at the driving side D and the rotary unions at the following sides F and therefore interconnects them. Regarding the connection between the respective through-holes, both ends of the respective conduits 62 are connected between the same 'circled numbers' as illustrated in FIG. 1.

As described above, a multiple fluid supplying apparatus for carrier of semiconductor wafer polishing system has a dual system by isolating a power transferring system and a operational fluid supplying system to be a separated type of the central rotation axle 10 and the fluid supplying tube body 20 and is structured to support securely rotational parts by the spindle 40 and the spindle housing 42. Thus, the rolling phenomenon between both ends of the central rotation axle 10 is minimized when it rotates so that sealing performance is improved, operational fluid is supplied to respective carriers smoothly, and high sealing property is maintained by simplifying a contact portion between a rotating body and a non-rotating body into a single-layered sealing structure.

Hereinafter, a sealing principle of operational fluid by the sealing unit 30 is described. A supplying path of operational fluid is formed in a manner that operational fluid is exhausted toward the through-hole 31b of the sealing housing 31 through the respective fluid paths 23 of the fluid supplying tube body 20 and the through-holes 24 of the inner stacked support ring 25. When operation fluid is exhausted through the through-holes 24 of the inner stacked support ring 25 and the through-hole 31b of the sealing housing 31, a fluid leakage into an inner side of the sealing housing 31 is cut off by an O-ring, while a fluid leakage into an outer side of the fluid supplying tube body 20 is cut off by a seal due to a close contact between an outer surface of the deionized water circulation ring 26 and a packing ring 35 where frictional force occurs between a non-rotational body and a rotational body. That is, cooling water (deionized water) permeates into the contact surfaces between the outer surface of the deionized water circulation ring 26 and the packing ring 35 where frictional force occurs between a non-rotational body and a rotational body, via a deionized water path 28 of the manifold plate 27 and a deionized water path 21 of the fluid supplying tube body 20, thereby cooling water cools down and lubricates the frictional surface so that abrasion of the packing ring 35 can be significantly decreased. Because the packing ring 35 is under pressure by the bellows ring 37, the packing ring 35 can be maintained to have a close contact with an outer surface of the deionized water circulation ring 26 by pressing force of the bellows ring 37 even when abrasion thereof occurs to some extent after using it for a long time so that deionized water cannot be permeated into an inner side of the apparatus.

Moreover, it should be understood by a skilled person in the art that the structure of the cooling circulation device in accordance with the present invention can be applied to an air-cooling type cooling structure when deionized water is not circulated, and to a water-cooling type cooling structure when deionized water is supplied through the deionized water path 28 of the manifold plate 27.

INDUSTRIAL APPLICABILITY

As described above, a multiple fluid supplying apparatus for carrier of semiconductor wafer polishing system according to the present invention accomplishes an effect that sealing performance is improved by minimizing a rolling phenomenon occurring between both ends of a central rotation axle when it rotates and operational fluid is supplied smoothly to each carrier, by providing a structure with a dual system by means of separating a power transfer system from an operational fluid supplying system and being capable of supporting a rotational portion securely by a spindle and a spindle housing in a CMP tool on which at least one carrier is mounted, and high sealing performance is maintained by establishing a simplified single-layered sealing structure of a contact portion between a rotational body and a non-rotational body.

In addition, the present invention accomplishes an effect that each carrier may rotate stably and thus sealing performance is improved by providing the structure where rotary unions at a driving side and at a following side are fixed securely onto a spindle.

Further, the present invention accomplishes an effect that sealing performance of a sealing member is maintained for a long time through preventing transformation of a sealing member due to a frictional heating by providing a means for supporting the sealing member with resilient pressure even though the sealing member is abraded to some extent and providing a cooling structure capable of exhausting heat smoothly outside which is generated at an inside of the spindle, without mounting a separate cooling circulation device as well.

Yet further, the present invention accomplishes an effect that the carrier axles of the respective carrier connection members and the driving devices thereof are structured independently by receiving them in separate spaces which are located at an outside of the spindle so that maintenance thereof can be simply performed by a partial disassembly and assembly without disassembling the whole apparatus.

Although the present invention is described with reference to the embodiments illustrated in the drawings, it shall be interpreted as illustrative rather than limiting. Therefore, it is obvious by a skilled person in the art that various modifications and equivalent embodiments may be conceivable and should fall upon the scope of the present invention. Thus, the breadth and scope of the present invention should be defined by the following claims appended hereto.

What is claimed is:

1. A multiple fluid supplying apparatus for carrier of semiconductor wafer polishing system comprising:
    a driving source for generating certain rotational force;
    a rotary union at a driving side comprising a central rotation axle being rotatably supported for transferring the certain rotational force transferred from the driving source toward outside; a fluid supplying tube body being disposed coaxially with the central rotation axle, being fixedly supported, and being formed with a plurality of fluid paths at an inside thereof; a manifold plate for fixing the fluid supplying tube body and being provided with a plurality of fluid paths communicating with the fluid paths formed in the fluid supplying tube body; a sealing housing being disposed coaxially on an outer circumference of the fluid supplying tube body, being rotatably supported, being formed with through-holes communicating outside at positions corresponding to the respective fluid paths of the fluid supplying tube body, and being formed with a plurality of flow holes capable of flowing operational fluid along an inner circumferential surface of the respective through-holes; and a sealing unit being stacked mutually and operatively intervened between the fluid supplying tube body and the sealing housing for maintaining air-tightness therebetween;
    a spindle being installed rotatably on an outer side of the fluid supplying tube body, having a space for receiving a certain device therein, and being connected to the driving source independently of the central rotation axle for rotational force to be transferred from the deriving source;
    a non-rotatable spindle housing for supporting the spindle on an outer circumference thereof;
    at least one carrier connection axle being rotated at a certain speed upon receipt of rotational force from the central rotation axle of the rotary union at the driving side and being formed with a plurality of fluid paths therein;
    a carrier being fixedly connected at a bottom of the carrier connection axle;
    at least one rotary union at a following side comprising a central rotation axle being combined integrally with a top of the carrier connection axle and being rotated by rotational force transferred from the carrier connection axle, and being formed with a plurality of fluid paths for flowing fluid to a fluid communicating path formed at an inside of the carrier connection axle; a non-rotational sealing housing being disposed coaxially along a circumference of the central rotation axle, one end thereof being fixed to an inside of the spindle so as to support the central rotation axle to be rotated stably, being formed with through-holes communicating outside at positions corresponding to the respective fluid paths of the central rotation axle, and being formed with a plurality of flow holes capable of flowing operational fluid along inner circumferential surfaces of the respective through-holes; and a sealing unit being stacked mutually and operatively intervened between the central rotation axle and the sealing housing for maintaining air-tightness therebetween; and
    a plurality of conduits for connecting the through-holes together formed in the respective sealing housings of the rotary union at the driving side and the rotary union at the following side.

2. The multiple fluid supplying apparatus for carrier of semiconductor wafer polishing system according to claim 1, wherein the sealing unit of the rotary union at the driving side comprises a pair of inner stacked support rings being closely stacked respectively around an outer circumference of the fluid supplying tube body and being formed with a through-hole for flowing fluid; a deionized water circulation ring being intervened between the inner stacked support rings and communicating the through-holes between the fluid supplying tube body and the respective adjacent sealing housings; a pair of packing rings being contacted with upper and lower circumferential surfaces of the deionized water circulation ring for maintaining air-lightness; a pair of gasket rings disposed at upper and lower outsides of the respective packing rings; a pair of bellows rings disposed at upper and lower outsides of the respective gasket rings as a resilient pressing means for providing pressing force to press the respective packing rings toward upper and lower circumferential surfaces of the deionized water circulation ring; and a pair of outer stacked support rings being closely stacked on inner circumferential surfaces of the respective sealing housings for fixing and supporting the gasket rings and the bellows rings; and wherein the packing rings, the deionized water circulation ring, the outer stacked support rings, the packing rings, the gasket rings, and the bellows rings respectively are stacked in a multiple number in a space between the fluid supplying tube body and the respective sealing housings, while being mutually combined with each other.

* * * * *